US011022418B2

(12) United States Patent
 Kanematsu

(10) Patent No.: US 11,022,418 B2
(45) Date of Patent: Jun. 1, 2021

(54) FORM MEASURING APPARATUS

(71) Applicant: MITUTOYO CORPORATION, Kanagawa (JP)

(72) Inventor: Toshihiro Kanematsu, Miyazaki (JP)

(73) Assignee: MITUTOYO CORPORATION, Kanagawa (JP)

( * ) Notice: Subject to any disclaimer, the term of this patent is extended or adjusted under 35 U.S.C. 154(b) by 155 days.

(21) Appl. No.: 16/527,438

(22) Filed: Jul. 31, 2019

(65) Prior Publication Data

US 2020/0041246 A1 Feb. 6, 2020

(30) Foreign Application Priority Data

Aug. 6, 2018 (JP) .............................. JP2018-147879

(51) Int. Cl.
 *G01B 5/20* (2006.01)
 *G01B 5/00* (2006.01)
(52) U.S. Cl.
 CPC ......... *G01B 5/0009* (2013.01); *G01B 5/0004* (2013.01); *G01B 5/20* (2013.01)
(58) Field of Classification Search
 CPC ....... G01B 5/0009; G01B 5/20; G01B 5/0004
 USPC ........ 33/503, 1 BB, 501.02, 501.03, 501.04, 33/551, 553, 554, 555
 See application file for complete search history.

(56) References Cited

U.S. PATENT DOCUMENTS

| | | | | | |
|---|---|---|---|---|---|
| 2,307,831 | A | * | 1/1943 | Hamilton | ............. G01B 5/0004 33/572 |
| 2,814,123 | A | * | 11/1957 | Banks | .................. G01B 5/0004 33/838 |
| 4,265,022 | A | * | 5/1981 | Noguchi | ................ G01B 3/008 33/553 |
| 5,040,308 | A | * | 8/1991 | Meyer | .................... G01B 5/061 33/832 |
| 5,724,745 | A | * | 3/1998 | Brenner | ............. G05B 19/4207 33/1 M |
| 6,327,788 | B1 | * | 12/2001 | Seddon | .................. G01B 5/008 33/551 |
| 6,625,894 | B1 | * | 9/2003 | Kovach | .............. B23Q 17/2216 33/201 |
| 8,065,812 | B2 | * | 11/2011 | Zhang | ..................... G01B 3/22 33/533 |

(Continued)

FOREIGN PATENT DOCUMENTS

| | | | | |
|---|---|---|---|---|
| GB | 2167559 | A * | 5/1986 | ........... G01B 21/047 |
| JP | 6168946 | B | 7/2017 | |

*Primary Examiner* — Christopher W Fulton
(74) *Attorney, Agent, or Firm* — Greenblum & Bernstein, P.L.C.

(57) ABSTRACT

A form measuring apparatus that is provided with a form measuring device that includes a detection device detecting a position on a surface of an object, and a feeding mechanism that moves the form measuring device in an axis direction. The feeding mechanism includes a drive shaft provided so as to be rotatable around an axis; a traction nut that is provided so as to hold the drive shaft from a direction orthogonal to an axis line of the drive shaft, and that also can switch between a frictional contacting state frictionally contacting the drive shaft and a separation state separated from the drive shaft; and a bracket coupling the traction nut and the form measuring device. The bracket is provided with a motor that includes a rotation shaft that is inclined with respect to the axis line, and the motor rotates the drive shaft.

4 Claims, 8 Drawing Sheets

(56) References Cited

U.S. PATENT DOCUMENTS

| | | |
|---|---|---|
| 9,227,286 B2 | 1/2016 | Sakai |
| 9,441,715 B2 | 9/2016 | Onodera et al. |
| 2001/0008047 A1* | 7/2001 | Okada ................... G01B 5/008 33/503 |
| 2002/0124427 A1* | 9/2002 | Nishimura ............. G01Q 10/02 33/554 |
| 2004/0221465 A1* | 11/2004 | Smith ................. G01B 5/0002 33/551 |
| 2018/0340798 A1* | 11/2018 | Kajihara ................. G01B 5/28 |

* cited by examiner

FORM MEASURING APPARATUS

The present application claims priority under 35 U.S.C. § 119 of Japanese Application No. 2018-147879, filed on Aug. 6, 2018, the disclosure of which is expressly incorporated by reference herein in its entirety.

BACKGROUND OF THE INVENTION

1. Field of the Invention

The present invention relates to a form measuring apparatus, and in particular, relates to a form measuring apparatus that measures a surface of an object.

2. Description of Related Art

High-resolution accuracy is required for a form measuring apparatus measuring a form or roughness on a surface of an object. Accordingly, a differential transformer or a differential inductance method is generally adopted for a detection device. In such a form measuring apparatus, a detection stroke width for measurement is about 1 mm. Therefore, matching a position of the detection device with a measurement starting point of the object is very difficult. In particular, positioning the detection device in a Z-axis direction (height direction) requires careful work so as not to damage the object or the detection device.

From a perspective of achieving both high-speed movement (coarse movement) and fine positioning (fine movement) of the detection device, a form measuring apparatus is disclosed in Japanese Patent No. 6168946, the form measuring apparatus provided with a traction nut that can switch between a frictional contacting state in which a twist roller frictionally contacts a drive shaft and a separation state separating the twist roller from the drive shaft. In the form measuring apparatus, the detection device can be coarsely moved along the drive shaft by having the traction nut in the separation state. On the other hand, the detection device can be finely moved along the drive shaft according to a lead angle of the twist roller, by having the traction nut in the frictional contacting state and rotating the drive shaft.

Also, in the form measuring apparatus, progress is made in automation of positioning the detection device in the Z-axis direction, and a system is considered in which a high speed movement and a low speed movement in a full stroke range or a partial stroke range of a column axis is enabled by an electrical column that motor controls a column axis.

In such a form measuring apparatus, when a motor and a motor controller are provided for automation of positioning the detection device in the Z-axis direction, installing cables that connect between the motor and the motor controller becomes a challenge. For example, the cables may bend or deteriorate due to the movement of the detection device. In addition, tension from such cables is a barrier to smooth movement of the detection device.

SUMMARY OF THE INVENTION

The present invention provides a form measuring apparatus that includes an electrical feeding mechanism for positioning a detection device to simplify routing cables and achieve smooth movement of the detection device.

One aspect of the present invention is a form measuring apparatus that is provided with a form measuring device that includes a detection device detecting a position on a surface of an object, and a feeding mechanism that moves the form measuring device in an axis direction. The feeding mechanism includes a drive shaft provided so as to be rotatable around an axis; a traction nut that is provided so as to hold the drive shaft from a direction orthogonal to an axis line of the drive shaft, and that can switch between a frictional contacting state frictionally contacting the drive shaft and a separation state separated from the drive shaft; and a bracket coupling the traction nut and the form measuring device. The traction nut is provided with a twist roller rotatably and axially supported in a state having an inclination angle equivalent to a lead angle with respect to the axis line of the drive shaft. When the drive shaft is rotated in a state where the traction nut frictionally contacts the drive shaft, the traction nut finely moves along the drive shaft according to the lead angle. In a state where the traction nut is separated from the drive shaft, the traction nut is configured so as to coarsely move along the drive shaft freely. The traction nut further includes an open/close lever to perform a switching operation between the frictional contacting state and separation state of the traction nut and a biaser that generates a biasing force such that the traction nut frictionally contacts the drive shaft. The open/close lever, by an operation from a user, resists the biasing force of the biaser and puts the traction nut in the separation state. When the user releases the open/close lever, the traction nut returns to the frictional contacting state due to the biasing force of the biaser. The bracket is provided with a motor that includes a rotation shaft that is inclined with respect to the axis line, and the motor rotates the drive shaft.

According to this configuration, the motor for rotating the drive shaft is provided to the bracket that vertically moves together with the form measuring device, and therefore the cables between the motor and the controller can be short and a load is not applied on the cables even when the form measuring device moves up and down.

The form measuring apparatus may further include a rotation member that rotates centering on the rotation shaft of the motor and contacts the drive shaft to rotate the drive shaft. The rotation member is a roller or a sphere. Accordingly, the drive shaft can be rotated around the axis by the rotation member that rotates due to the motor.

In the form measuring apparatus noted above, the motor may be a type that rotates the twist roller. Accordingly, the drive shaft can be rotated using the twist roller of the traction nut without adding a component.

BRIEF DESCRIPTION OF THE DRAWINGS

The present invention is further described in the detailed description which follows, in reference to the noted plurality of drawings by way of non-limiting examples of exemplary embodiments of the present invention, in which like reference numerals represent similar parts throughout the several views of the drawings, and wherein.

DETAILED DESCRIPTION OF THE INVENTION

Figure 1:
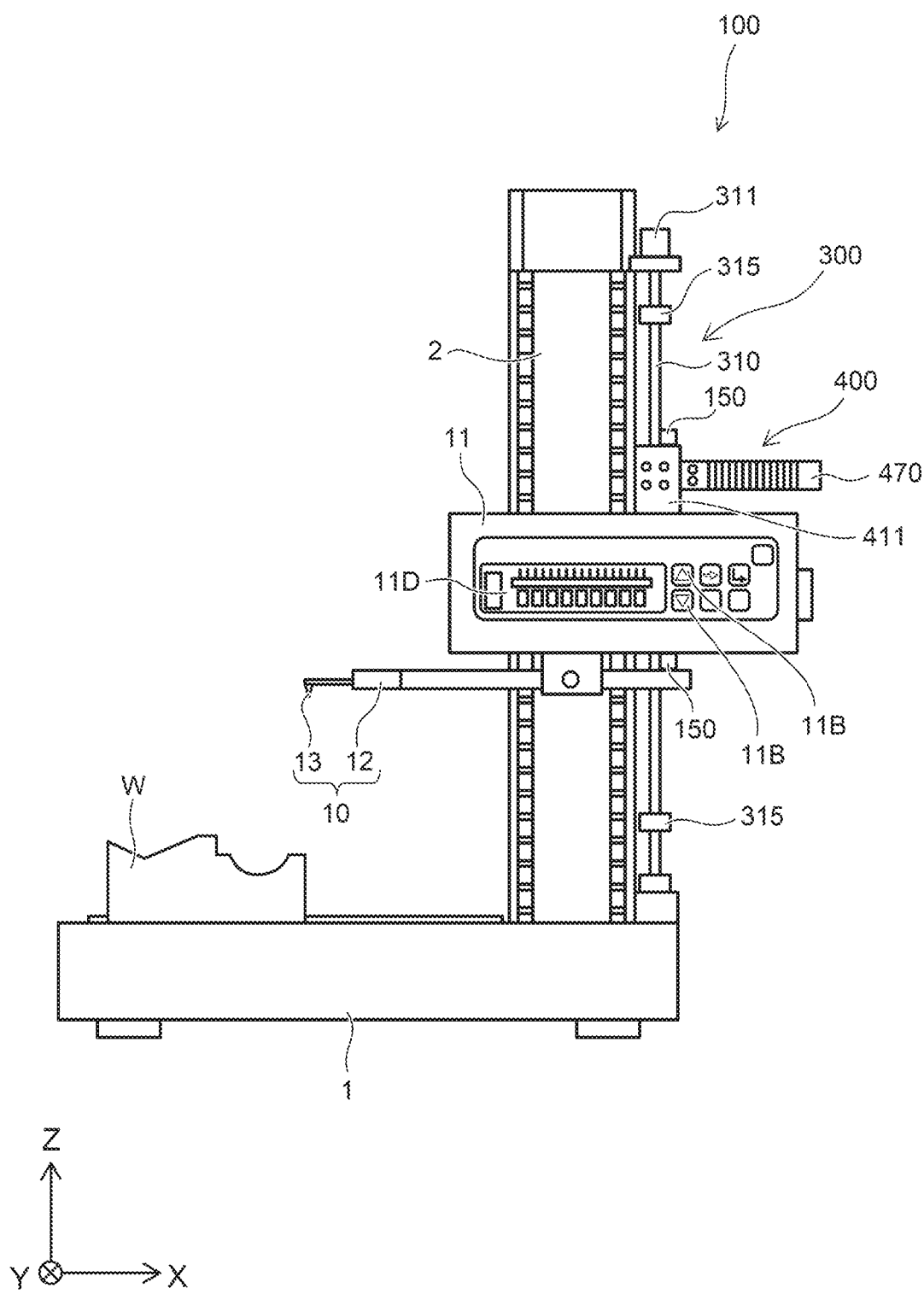
FIG. 1 illustrates a front view of an exemplary form measuring apparatus according to an embodiment.

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description taken with the drawings making apparent to those skilled in the art how the forms of the present invention may be embodied in practice.

Hereafter, an embodiment of the present invention is described with reference to the drawings. In the following description, portions identical to those which have been previously described are assigned identical reference numerals and a description thereof is omitted where appropriate.

Configuration of Form Measuring Apparatus

Figure 2:
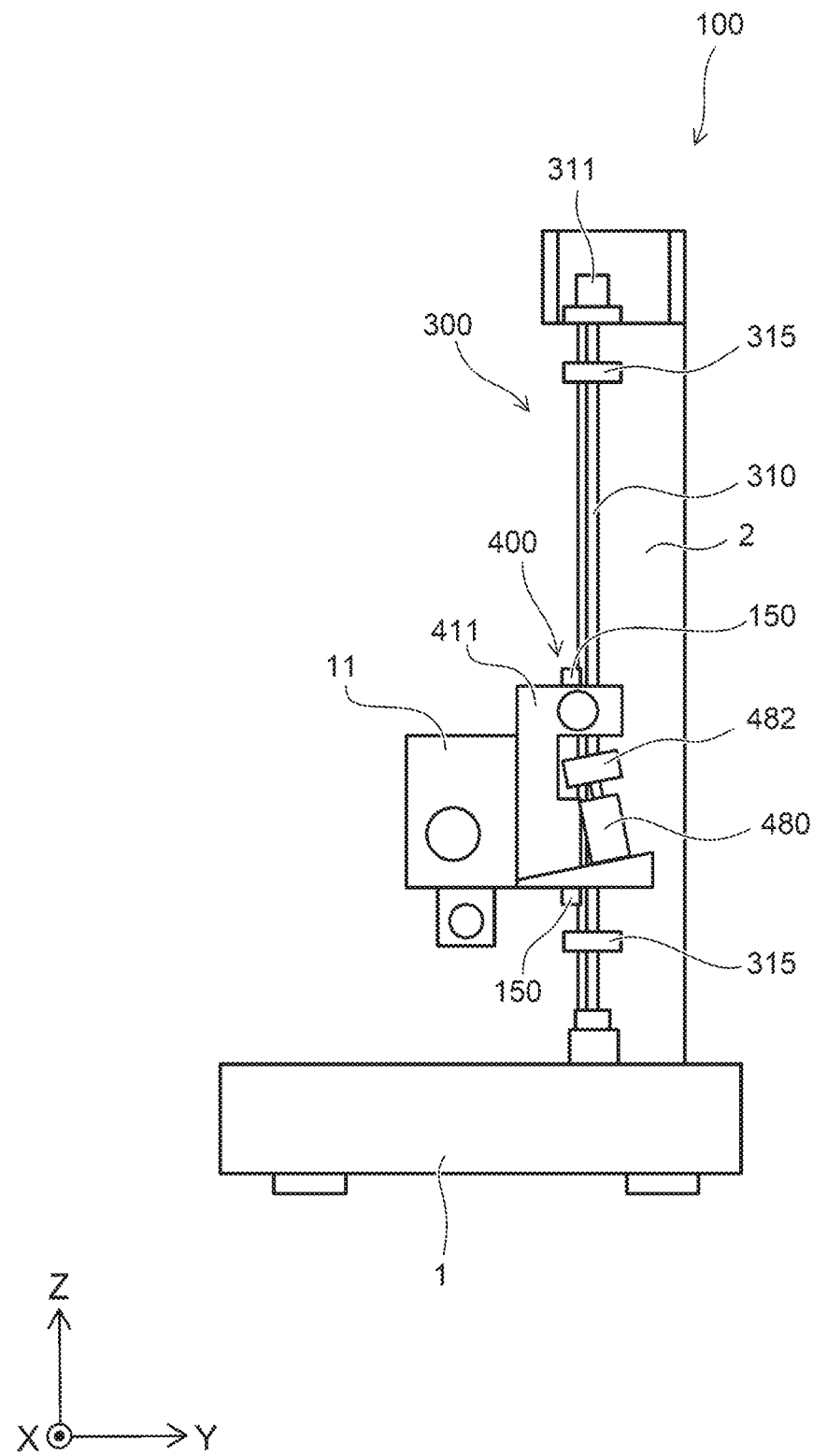
FIG. 2 illustrates a side view of an exemplary form measuring apparatus according to the embodiment.

FIG. 1 illustrates a front view of an exemplary form measuring apparatus according to the present embodiment. FIG. 2 illustrates a side view of the exemplary form measuring apparatus according to the present embodiment. As shown in FIGS. 1 and 2, a form measuring apparatus 100 according to the present embodiment includes a form measuring device 11 and a feeding mechanism 300. The form measuring device (form measuring instrument) 11 detects a position on a surface of an object W placed on a base 1. The form measuring device 11 is provided so as to move up and down along a support column 2 standing on the base 1. In the present embodiment, for ease of description, one direction along a placement surface of the object W on the base 1 is defined as an X direction, a direction along the placement surface and orthogonal to the X direction is defined as a Y direction, and a direction orthogonal to the X and Y directions (normal direction to the placement surface) is defined as a Z direction. Also, the Z direction may also be referred to as a vertical direction.

The form measuring device 11 includes a detector 12 and a stylus 13 provided to a foremost end of the detector 12. The detector 12 and the stylus 13 configure a detection device (detector) 10. A display 11D and operation buttons 11B are provided on a front face of the form measuring device 11. The form measuring device 11 measures coordinates in the Z direction when the stylus 13 contacts the surface of the object W. The coordinates in the Z direction are measured successively while displacing the detection device 10 in the X direction, and thereby a form or roughness of the surface of the object W is obtained.

In the form measuring apparatus 100, the feeding mechanism 300 is provided in order to align the form measuring device 11 at the height of the object W and to move the form measuring device 11 in the Z direction quickly. The feeding mechanism 300 moves the form measuring device 11 in an axis direction of the support column 2 (Z direction: vertical direction) and is provided with a drive shaft 310 and a traction nut 400.

The drive shaft 310 stands upright on the base 1 so as to be parallel to the support column 2. The drive shaft 310 may be configured to be able to operate rotation by a knob 311 provided to a top end thereof.

Figure 3:
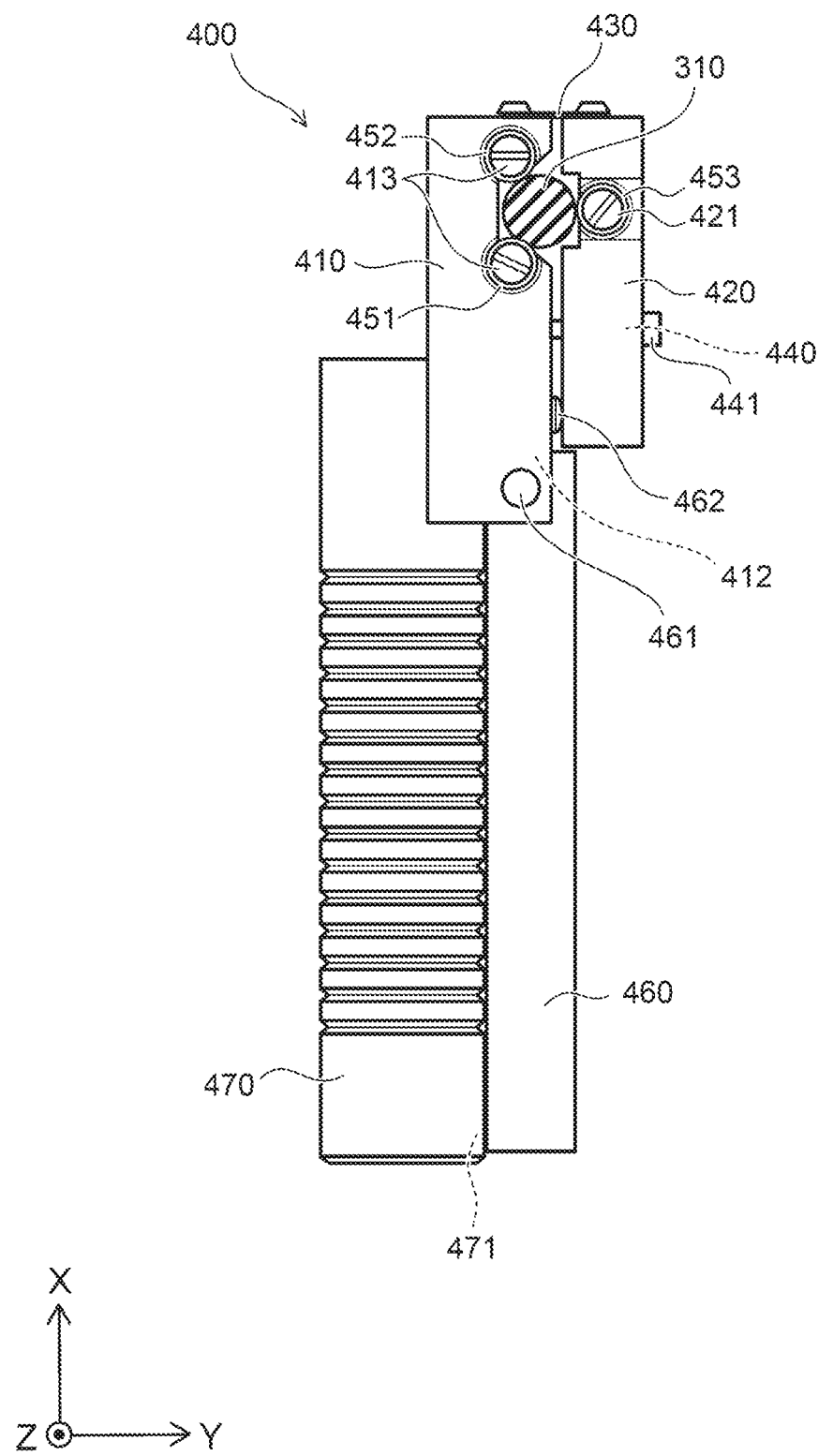
FIG. 3 is a cross-sectional view of a feeding mechanism viewed in a Z direction.

FIG. 3 is a cross-sectional view of the feeding mechanism in the Z direction. The traction nut 400 is provided so as to be capable of tightening/loosening with respect to the drive shaft 310. In other words, the traction nut 400 is normally friction-engaged with the drive shaft 310. However, the traction nut 400 is loosened by a lever operation from a user and disengages from the drive shaft 310.

The traction nut 400 includes a fixed piece 410, a movable piece 420, a hinge piece 430, a spring 440, a plurality of twist rollers 451, 452, and 453, an open/close lever 460, and a handle 470.

The drive shaft 310 is held so as to be capable of tightening/loosening by the fixed piece 410 and the movable piece 420. With respect to the drive shaft 310 standing upright in the Z direction, the fixed piece 410 and the movable piece 420 are members having length in the X direction. The drive shaft 310 is held between the fixed piece 410 and the movable piece 420. End faces of the fixed piece 410 and the movable piece 420 are coupled by the hinge piece 430. The hinge piece 430 is a thin plate and has a certain degree of elasticity. Accordingly, the fixed piece 410 and the movable piece 420 can slightly open/close like a hinge.

The bracket 411 is attached to the fixed piece 410 and is further coupled to the form measuring device 11 (see FIG. 2). In other words, the bracket 411 couples the traction nut 400 and the form measuring device 11.

In the fixed piece 410, a groove 412 is provided to an end portion on an opposite side from the hinge piece 430. In the fixed piece 410, the groove 412 is on an opposing side from the movable piece 420 and has a predetermined length in the X direction. The groove 412 is to attach the open/close lever 460.

In the traction nut 400, the spring 440 is provided to an opposing end portion from the hinge piece 430 with the drive shaft 310 in the middle. In this example, a coil spring is used, but any elastic body (biaser) that generates a biasing force may be used. The spring 440 is pressed to the movable piece 420 from the side opposing of the fixed piece 410. A screw 441 is provided so as to pass through the spring 440 and the movable piece 420 and a forefront end of the screw 441 is threaded with the fixed piece 410. Therefore, the movable piece 420 is pressed toward the fixed piece 410 by the biasing force from the spring 440.

Here, a configuration is applied such that the movable piece 420 is pressed toward the fixed piece 410, however, the movable piece 420 may be pulled toward the fixed piece 410.

In the traction nut 400 according to the present embodiment, the three twist rollers 451, 452, and 453 are provided. Two twist rollers 451 and 452 of the three twist rollers 451, 452, and 453 are supported on the fixing portion 410 by screw pins 413. The remaining twist roller 453 is supported on the movable piece 420 by a screw pin 421.

Figure 4:
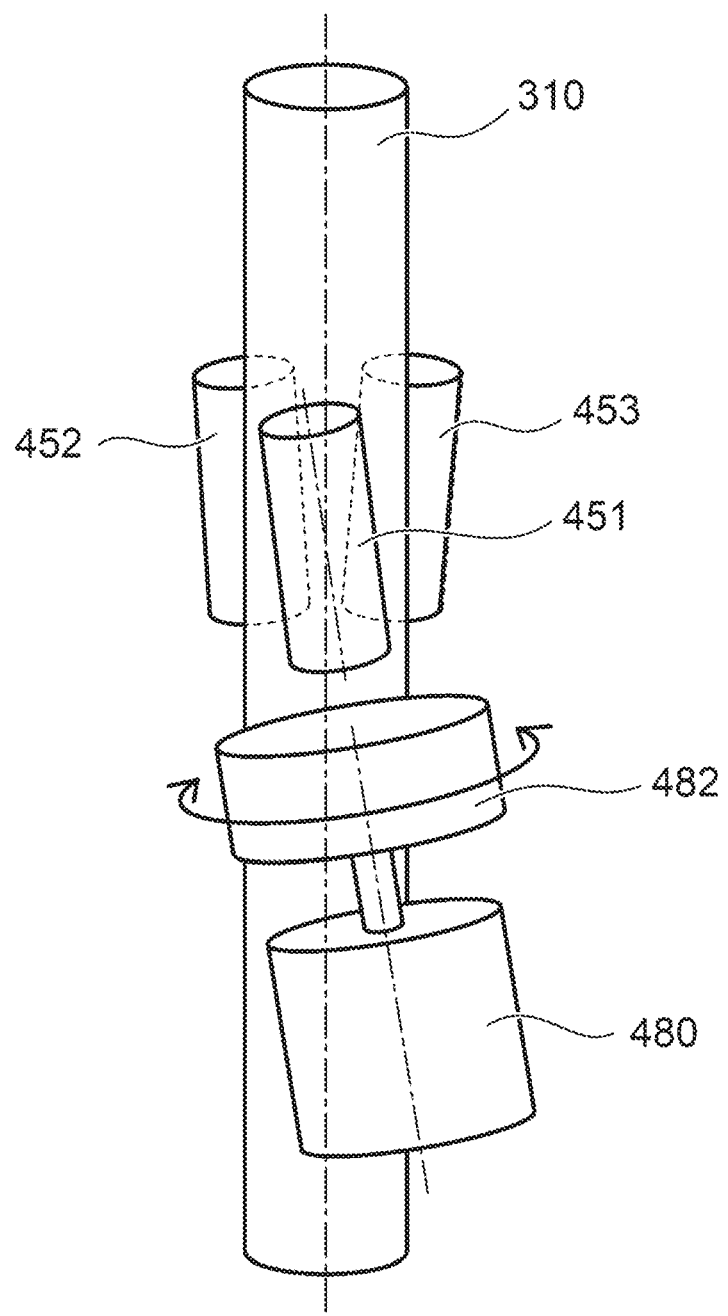
FIG. 4 is a schematic view illustrating an exemplary arrangement of a twist roller.

As shown in FIG. 4, the three twist rollers 451, 452, and 453 are rotatably and axially supported in a state having an inclination angle equivalent to a lead angle with respect to an axis line of the drive shaft 310. When the drive shaft 310 is rotated in a state where the drive shaft 310 is in contact with the twist rollers 451, 452, and 453, which have inclined rotation shafts, the traction nut 400 advances and retreats in the axis direction of the drive shaft 310.

The open/close lever 460 is a member having length in the X direction and the forefront end of the open/close lever 460 is loosely inserted into the groove 412 of the fixed piece 410 and axially supported by a center rod 461 to enable oscillation. The center rod 461 is in the Z direction, and therefore, the open/close lever 460 is inside the XY plane and can oscillate in a Y axis direction. A push pin 462 projects on the forefront end of the open/close lever 460. The push pin 462 projects from the fixed piece 410 in a direction toward the movable piece 420. The movable piece 420 is pressed by the spring 440 toward the fixed piece 410, and therefore, the push pin 462 is normally pressed by the movable piece 420 toward the fixed piece 410.

Figure 5:
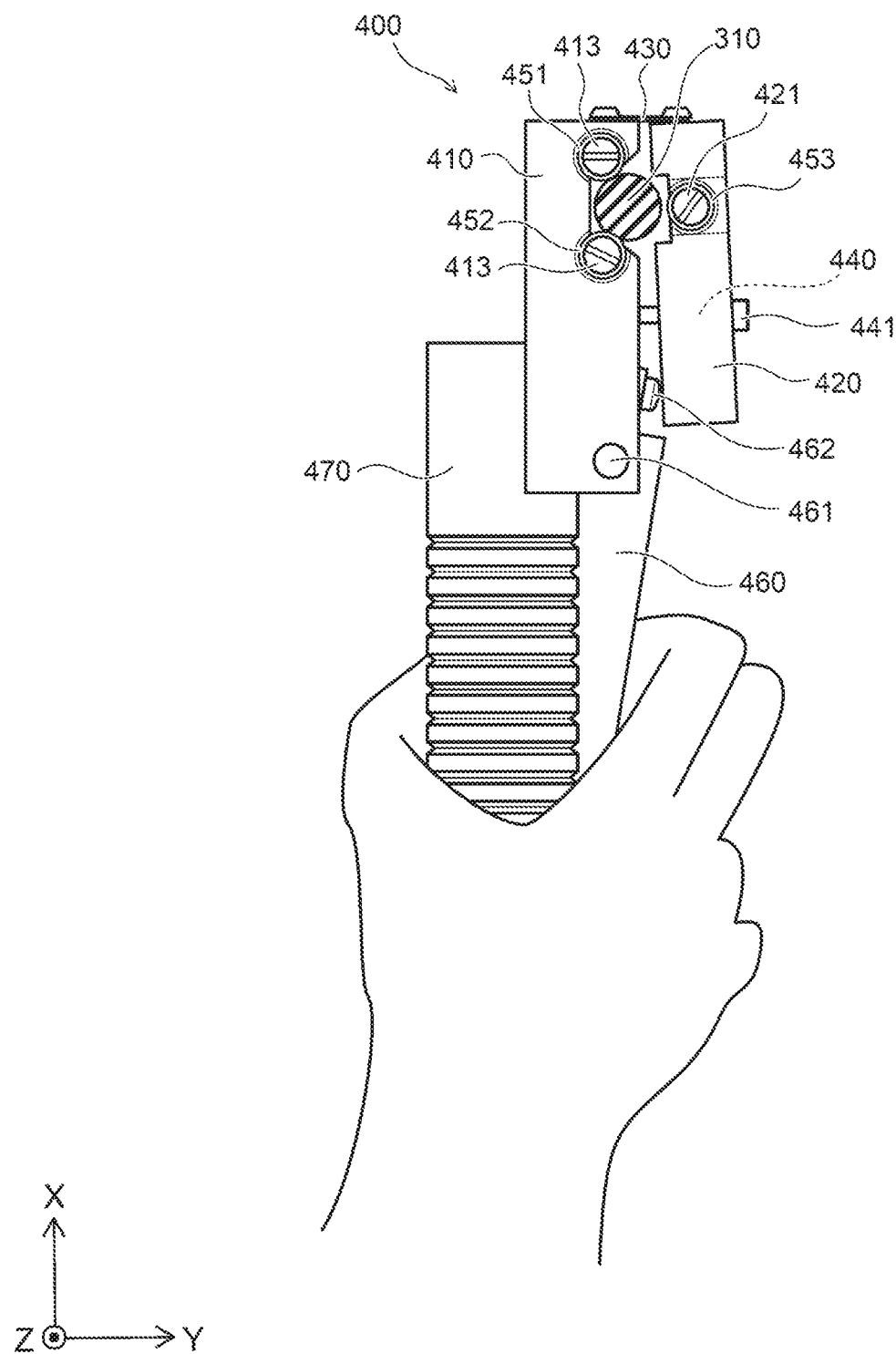
FIG. 5 is a cross-sectional view of an exemplary state when an open/close lever is oscillated.

FIG. 5 is a cross-sectional view of an exemplary state where an open/close lever is oscillated. When the open/close lever 460 is oscillated, the push pin 462 is moved toward the opposing side from the open/close lever 460. In other words, the movable piece 420 can be pressed to the side where the movable piece 420 separates from the fixed piece 410 by oscillating the open/close lever 460. When the movable piece 420 is separated from the fixed piece 410, the twist rollers 451, 452, and 453 are separated from the drive shaft 310 accordingly. In this state, the traction nut 400 and the drive shaft 310 are separated, and therefore, the traction nut 400 can be moved freely.

The handle 470 has length in the X direction. Also, the handle 470 is fixated to the fixed piece 410. The handle 470 includes a groove line 471 along the axis line thereof. The groove line 471 has enough width to receive the open/close lever 460.

As for a positional relationship between the handle 470 and the open/close lever 460, both are substantially parallel to each other. The two are arranged such that when the user grips the handle 470, the open/close lever 460 is naturally grasped, as well. When the open/close lever 460 is grasped together with the handle 470, the open/close lever 460 is configured to be received in the groove 412 of the handle 470. Accordingly, oscillation of the open/close lever 460 is allowed and also the open/close lever 460 and the handle 470 can be grasped easily at the same time.

Specifically, when the user grips the handle 470, the open/close lever 460 is also grasped. At this point, the push pin 462 of the open/close lever 460 pushes the movable piece 420. Then, the traction nut 400 is separated from the drive shaft 310 and becomes free. For the user, once the handle 470 is gripped, even without any special intent, the traction nut 400 automatically becomes free. Therefore, the user may hold the handle 470 and move the form measuring device 11 in the Z direction.

On the other hand, when the user releases the handle 470, the open/close lever 460 also separates from the user's hand. At this point, the movable piece 420 approaches the fixed piece 410 due to the biasing force from the spring 440. Then, the twist rollers 451, 452, and 453 come into contact with the drive shaft 310 and friction acts between the traction nut 400 and the drive shaft 310. Therefore, when the user releases the handle 470, the position of the traction nut 400 (i.e., position of the form measuring device 11) is fixed.

In the feeding mechanism 300, a counter balance may further be provided. When the user grips the handle 470 and lifts upward, with too much pressure the handle 470 may move drastically. Also, the form measuring device 11 may fall if not firmly supported when the user pulls the handle 470 downward. Therefore, the counter balance may be provided.

The feeding mechanism 300 includes an electrical displacement mechanism in addition to a manual displacement mechanism such as the handle 470 in this example. In other words, as shown in FIGS. 2 and 4, a motor 480 rotating the drive shaft 310 is provided as the electrical displacement mechanism. The motor 480 is provided to the bracket 411 and moves together with the up and down movement of the form measuring device 11. The rotation shaft of the motor 480 is inclined with respect to the axis line of the drive shaft 310 (Z direction). The inclination angle of the rotation shaft of the motor 480 is preferably commensurate with the inclination angle to the axis line of the twist rollers 451, 452, and 453.

The motor 480 is provided with a roller 482 as a rotation member (rotator). The roller 482 is in contact with the drive shaft 310 and conveys the rotation of the motor 480 to the drive shaft 310. By rotating the drive shaft 310 with the rotation of the motor 480, the twist rollers 451, 452, and 453 also rotate. The traction nut 400 advances and retreats in the axis direction of the drive shaft 310 according to the lead angle of the twist rollers 451, 452, and 453, and of the drive shaft 310.

The roller 482 that is connected to the shaft of the motor 480 rotates the drive shaft 310, and therefore the roller 482 is in contact with the drive shaft 310 with a degree of adhesion enabling the drive shaft 310 to rotate. On the other hand, the twist rollers 451, 452, and 453 of the traction nut 400 are in contact with the drive shaft 310 with a degree of adhesion enabling the form measuring device 11 to be maintained at a predetermined vertical position. However, the twist rollers have a degree of adhesion that allows driven rotation with respect to the rotation of the drive shaft 310. Accordingly, even in a state where the form measuring device 11 is maintained at the predetermined vertical position by the traction nut 400, when the drive shaft 310 rotates with the rotation of the roller 482 from the motor 480, the form measuring device 11 can be moved up and down according to the lead angle of the twist rollers 451, 452, and 453.

In the present embodiment, the motor 480 for rotating the drive shaft 310 is provided to the bracket 411 that moves vertically together with the form measuring device 11, and therefore the cables between the motor 480 and the controller can be short and a load is not applied to the cables even when the form measuring device moves vertically. Therefore, installing the cable in consideration of the vertical movement of the form measuring device 11 is not necessary.

Block Configuration of Form Measuring Apparatus

Figure 6:
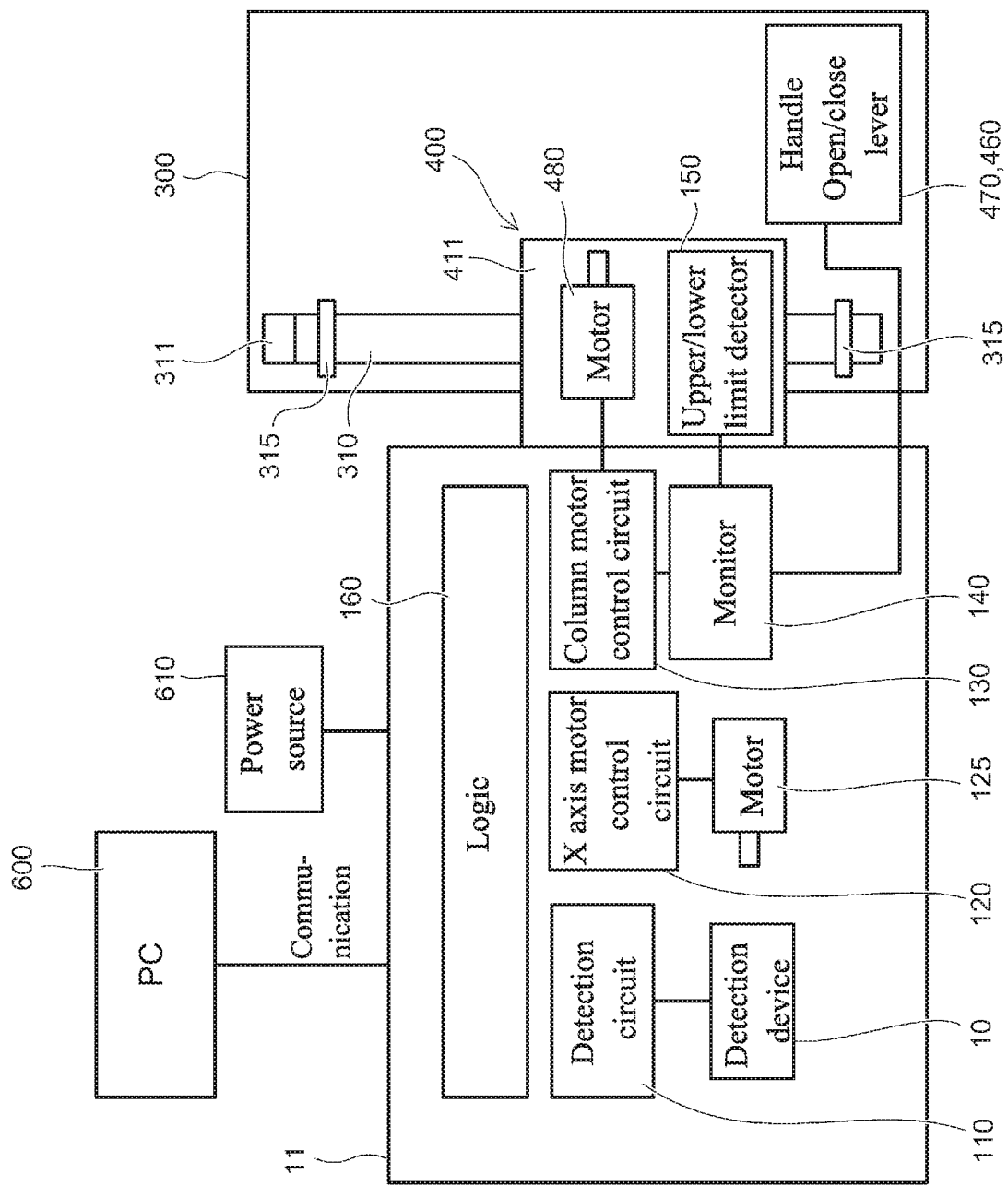
FIG. 6 is a block diagram illustrating an exemplary form measuring apparatus according to the embodiment.

FIG. 6 is a block diagram illustrating an exemplary form measuring apparatus according to the present embodiment. As shown in FIG. 6, the form measuring apparatus 100 includes the form measuring device 11 and the feeding mechanism 300. A measurement system is configured by connecting a computer 600 and a power source 610 to the form measuring device 11.

The form measuring device 11 includes a detection circuit 110 detecting coordinates in the Z direction based on a signal output from the detection device 10, an X axis motor control circuit 120 controlling the motor 125 moving the detection device in the X direction, a column motor control circuit 130 controlling the motor 480 that vertically moves the form measuring device 11, a monitor 140 monitoring the vertical position of the form measuring device 11, an upper/lower limit detector 150 detecting limits of the vertical position of the form measuring device 11, and a logic (control circuit) 160 performing overall control.

The feeding mechanism 300 includes the drive shaft 310, the traction nut 400, and the bracket 411. The user, by operating the open/close lever 460 of the handle 470, switches the friction contact and separation between the traction nut 400 and the drive shaft 310 and can coarsely and vertically move the form measuring device 11 manually.

Further, by operating the operation buttons 11B of the form measuring device 11, the user can move the form measuring device 11 up and down electrically. When the upper or lower operation button 11B is selected, an instruction for normal rotation or reverse rotation is sent to the motor 480 from the column motor control circuit 130. The roller 482 rotates due to the rotation from the motor 480 and the drive shaft 310 rotates. The form measuring device 11 moves vertically in response to the rotation direction of the drive shaft 310.

Also, by rotating the knob 311 provided to the top end of the drive shaft 310 to manually rotate the drive shaft 310, the user can finely move the form measuring device 11 vertically.

On the top and bottom of the drive shaft 310, stoppers 315 are provided to define the upper and lower limit positions. When the form measuring device 11 is moved up and down manually or electrically, in a case where the upper/lower limit detector 150 comes into contact with a stopper 315 or the distance between the upper/lower limit detector 150 and a stopper 315 is below a predetermined value, the monitor 140 determines that the upper or lower limit position has been reached and outputs a warning, for example. Further, when the form measuring device 11 is moved up and down electrically, the monitor 140 may issue an instruction to stop the column motor control circuit 130, and the vertical movement of the form measuring device 11 may be forcibly stopped by stopping the rotation of the motor 480.

Operation of Form Measuring Apparatus

Next, a measuring operation of the form measuring apparatus 100 is described. First, after the object W is placed on the base 1, the stylus 13 is positioned at the measurement starting point of the object W. At this point, the position of the form measuring device 11 is adjusted to be just slightly higher than the object W. At this time, the user may grip the handle 470 and move the traction nut 400 in the Z direction. As noted above, once the handle 470 is gripped, the traction nut 400 is automatically able to be moved freely.

When the position of the form measuring device 11 reaches an approximate desired height, the user stops the handle 470 then just releases the handle 470. The form measuring device 11 stops at that position.

Next, the user operates the operation buttons 11B and rotates the drive shaft 310 with the motor 480, and the form measuring device 11 is moved up and down electrically. In a case where further fine adjustment is required, the knob 311 provided to the top end of the drive shaft 310 may be turned to rotate the drive shaft 310. Accordingly, due to the inclination of the twist rollers 451, 452, and 453, the traction nut 400 is moved vertically and the vertical position of the form measuring device 11 can be adjusted finely.

When the form measuring device 11 is moved up and down using the handle 470 or the knob 311, the motor 480 is stopped so as not to lose the feeling of the manual operation, and at such times the output rotation of the motor 480 is preferred to be in a free state. Also, when the upper/lower limit detector 150 is operating, the warning is issued and the motor 480 is forcibly stopped, for example.

According to the present embodiment, the present invention provides a feeding mechanism 300 that has excellent operability and is capable of switching coarse movement and fine movement. In addition, routing the cables between the motor 480 and the controller can be simplified, and smooth movement of the form measuring device 11 can be achieved.

Other Examples of Rotation Member

Figure 7:
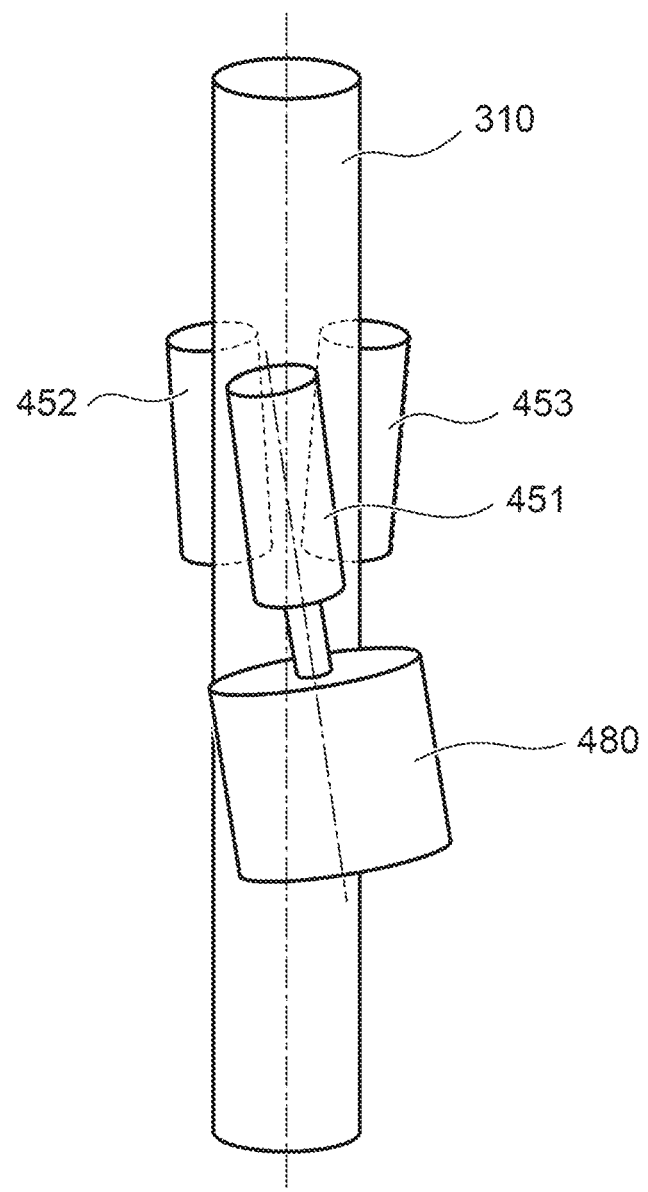
FIG. 7 is a schematic view illustrating another example of a rotation member.
Figure 8:
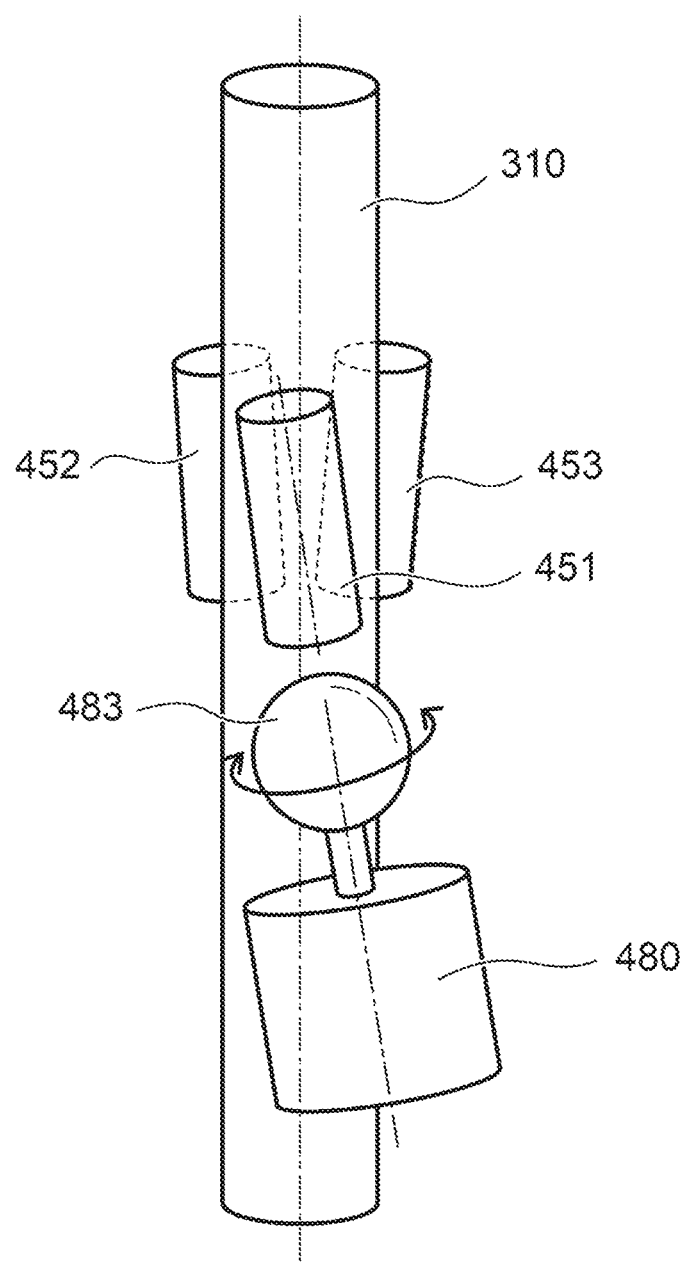
FIG. 8 is a schematic view illustrating another example of a rotation member.

FIGS. 7 and 8 are schematic views illustrating other examples of the rotation member. The example of the rotation member shown in FIG. 7 uses one of the twist rollers 451, 452, and 453 as the rotation member. For example, the twist roller 451 is attached to the shaft of the motor 480 as the rotation member. The twist roller 451 is used, as the traction nut 400, to switch between the frictional contacting state and the separation state with the drive shaft 310 by operating the handle 470 and the open/close lever 460, and also is used as the rotation member to rotate the drive shaft 310 electrically. Accordingly, it is not necessary to add a separate member to convey the rotation of the motor 480 to the drive shaft 310.

The example of the rotation member shown in FIG. 8 is a sphere 483. By using the sphere 483 as the rotation member instead of the roller 482, the rotation member can be reduced in size compared to the roller 482. Also, the surface of the drive shaft 310 and the rotation member are in point contact with each other and wear is suppressed.

As described above, according to the present embodiment, in the form measuring apparatus 100 that includes the electrical feeding mechanism 300 for positioning the form measuring device 11, the present invention can simplify routing cables and achieve smooth movement of the form measuring device 11.

Modification of Embodiment

Embodiments of the invention are described above. However, the present invention is not limited to these examples. For example, in the above description, the vertical movement is instructed by the operation buttons 11B of the form measuring device 11. However, a remote operation may be performed by a remote controller or the computer 600. Also, an example is described in which the traction nut 400 includes the three twist rollers 451, 452, and 453. However, the present invention is not limited to three. With respect to the above-described embodiments, a person skilled in the art can perform addition, deletion, and design modification of configuration elements as appropriate, and can combine features of the embodiments as appropriate, and such modifications are also included in the scope of the present invention as long as they fall within the subject matter of the present invention.

As noted above, the present invention can be utilized favorably with an apparatus measuring a surface form of an object, as well as measuring surface roughness.

It is noted that the foregoing examples have been provided merely for the purpose of explanation and are in no way to be construed as limiting of the present invention. While the present invention has been described with reference to exemplary embodiments, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular structures, materials and embodiments, the present invention is not intended to be limited to the particulars disclosed herein; rather, the present invention extends to all functionally equivalent structures, methods and uses, such as are within the scope of the appended claims.

The present invention is not limited to the above described embodiments, and various variations and modifications may be possible without departing from the scope of the present invention.

What is claimed is:

1. A form measuring apparatus comprising:
a form measuring instrument comprising a detector that detects a position on a surface of an object; and
a feeding mechanism that moves the form measuring instrument in an axial direction, the feeding mechanism comprising:
   a drive shaft that rotates about an axis;
   a traction nut that holds the drive shaft in a direction orthogonal to an axis line of the drive shaft, and that is switchable between a frictional contacting state wherein the traction nut frictionally contacts the drive shaft and a separation state wherein the traction nut is disengaged from the drive shaft; and
   a bracket that couples the traction nut and the form measuring instrument,
wherein:
the traction nut includes a twist roller rotatably and axially supported in a state having an inclination angle equivalent to a lead angle with respect to the axis line of the drive shaft,
when the drive shaft is rotated in a state where the traction nut frictionally contacts the drive shaft, the traction nut finely moves along the drive shaft according to the lead angle,
in a state where the traction nut is separated from the drive shaft, the traction nut is configured so as to coarsely move along the drive shaft freely, and
the traction nut further comprises:
   an open/close lever that performs a switching operation between the frictional contacting state and the separation state of the traction nut; and
   an elastic body that generates a biasing force such that the traction nut frictionally contacts the drive shaft, wherein:
the open/close lever, by an operation from a user, resists the biasing force of the elastic body and places the traction nut in the separation state,
when the user releases the open/close lever, the traction nut returns to the frictional contacting state due to the biasing force of the elastic body, and
the bracket is provided with a motor that rotates the drive shaft and that includes a rotation shaft that is inclined with respect to the axis line, and the motor rotates the drive shaft.

2. The form measuring apparatus according to claim 1, further comprising:
a rotator that rotates centered on the rotation shaft of the motor and contacts the drive shaft to rotate the drive shaft.

3. The form measuring apparatus according to claim 2, wherein the rotator is one of a roller or a sphere.

4. The form measuring apparatus according to claim 1, wherein the motor rotates the twist roller.

* * * * *